July 29, 1952  A. P. S. GILMORE  2,605,106
POWER ACTUATED TRAILER LOAD FEEDER AND SPREADER
Filed Oct. 1, 1948  3 Sheets-Sheet 1
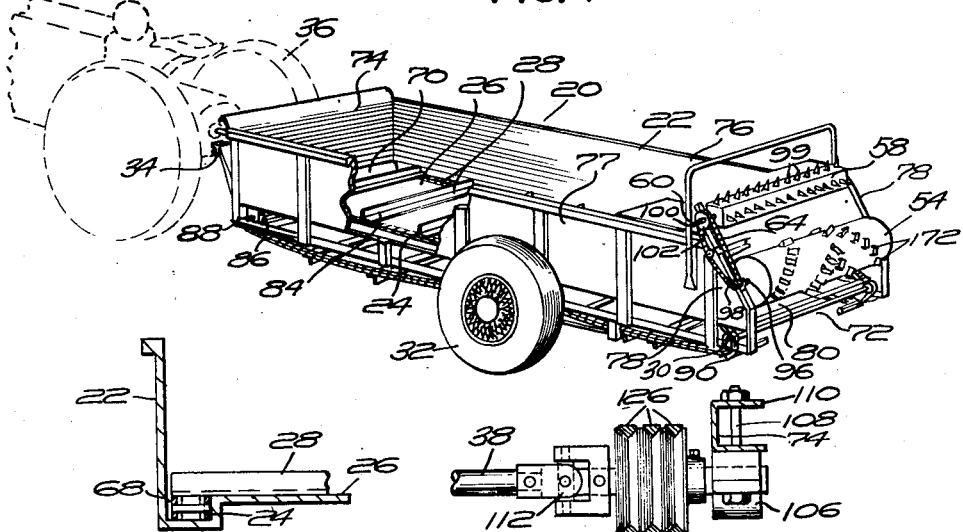
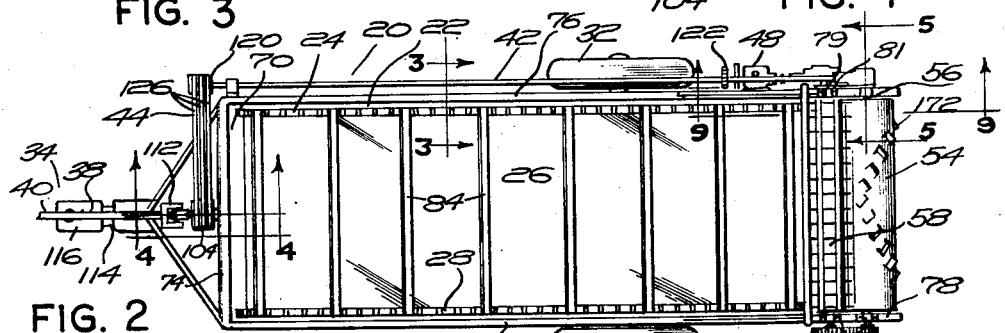
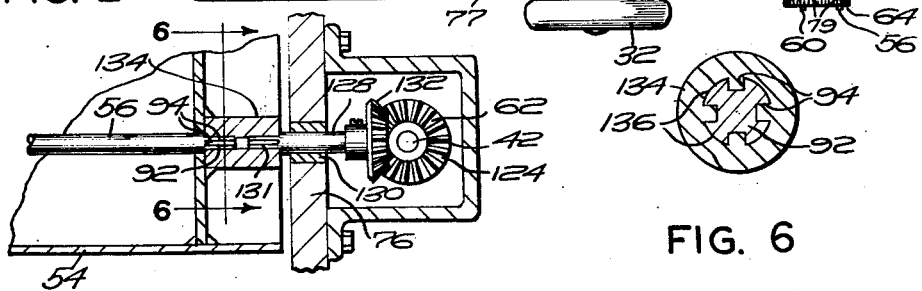
INVENTOR.
A. P. STUART GILMORE
BY
Thomas A. Jenckes
ATTORNEY July 29, 1952  A. P. S. GILMORE  2,605,106
POWER ACTUATED TRAILER LOAD FEEDER AND SPREADER
Filed Oct. 1, 1948  3 Sheets-Sheet 2
FIG. 7
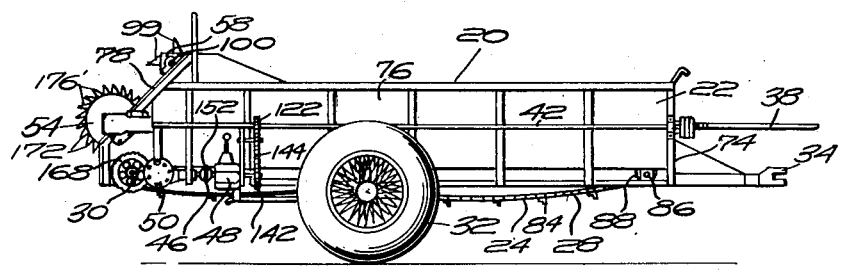
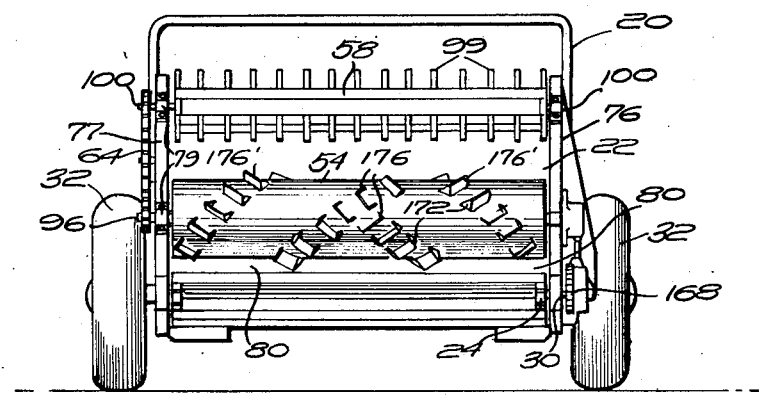
FIG. 8
INVENTOR.
A.P. STUART GILMORE
BY
Thomas A. Jenckes
ATTORNEY July 29, 1952  A. P. S. GILMORE  2,605,106
POWER ACTUATED TRAILER LOAD FEEDER AND SPREADER
Filed Oct. 1, 1948  3 Sheets-Sheet 3
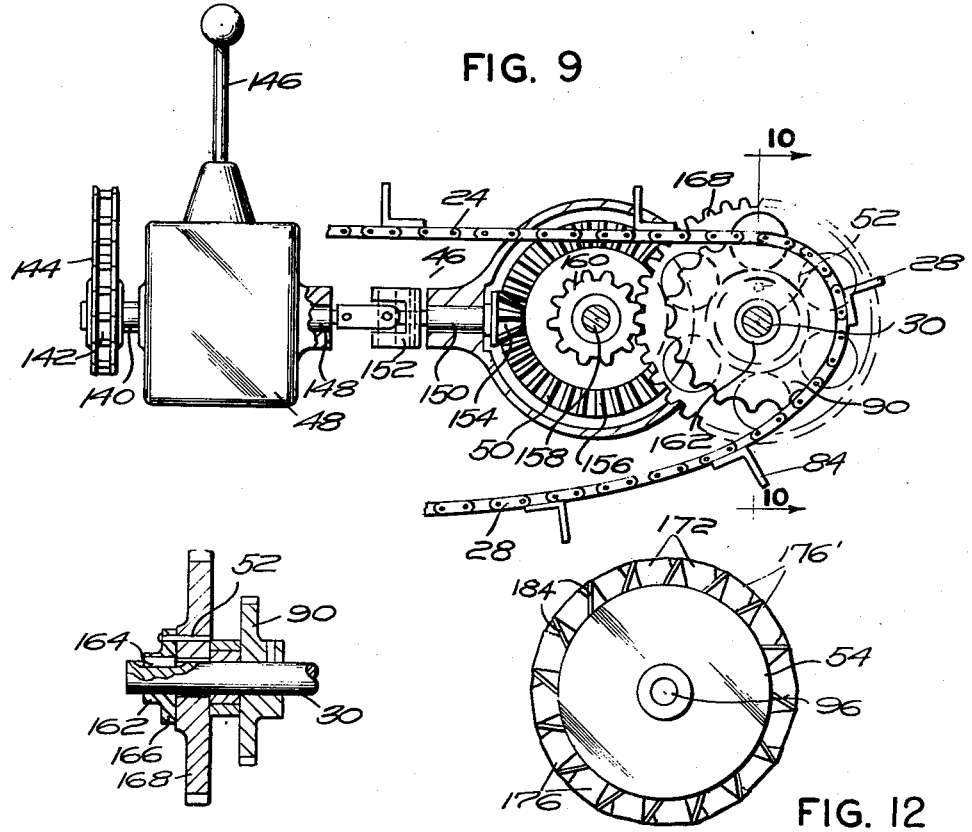
FIG. 9
FIG. 10
FIG. 12
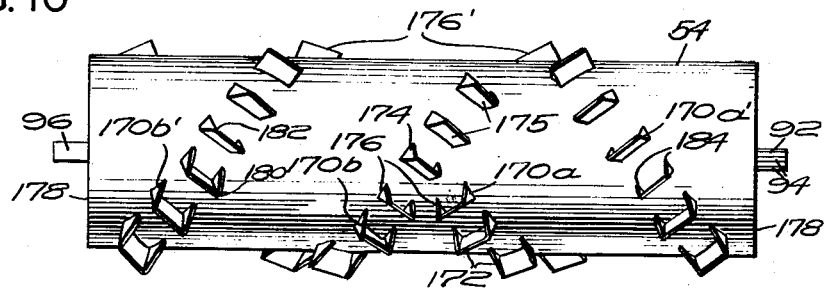
FIG. 11
INVENTOR.
A. P. STUART GILMORE
BY
Thomas A. Jenckes
ATTORNEY Patented July 29, 1952

2,605,106

UNITED STATES PATENT OFFICE 2,605,106

POWER ACTUATED TRAILER LOAD FEEDER AND SPREADER

Abiel P. Stuart Gilmore, Acushnet, Mass., assignor of one-half to Raymond A. White, Acushnet, Mass.

Application October 1, 1948, Serial No. 52,153

5 Claims. (Cl. 275—6)

My invention relates to power actuated trailer load feeders to which beater attachments also making them spreaders may be added, if desired.

After making an intensive study of manure spreaders on the market for a large farm where I am now employed, I came to the conclusion that there was no manure spreader on the market capable of being loaded by power satisfactorily, such as by a caterpillar driven automatic power shovel, and with this end in view I developed my improved trailer load feeder, the subject matter of this invention, adapted to be power loaded.

An object of my invention, therefore, is to provide a power actuated trailer load feeder of rugged enough construction and otherwise adapted to be loaded by power rapidly and one which will function to dispense its contents rapidly under power.

In developing the powerful drive necessary to feed the contents thereof rapidly under power, I have developed a strong powerful drive which can selectively drive either the beaters for spreading or the apron for feeding or both together, which provide another object of my invention, namely, the provision of a combination trailer load feeder and spreader, which can be selectively used as a feeder alone or as a combined feeder and spreader.

A further object of my invention is to provide a device which on removal of the beaters can be used as a feeder alone, or which, if the transmission is brought into neutral, can be used as a spreader alone, in case the beaters should become clogged up.

A further object of my invention is to employ for the first time in devices of this description, a speed change transmission, so that the rate of feeding thereof may be selectively varied, also, a device which will insure that the beaters perform at all times when the apron is brought into action to prevent clogging of the beaters in use.

In my experience with power feeders and spreaders, I have found that with the intermittent cog and wheel drive devices for the apron and the other drive mechanism employed thereon, that quite often the apron would become jammed and the drive mechanism or conveyor would break, and a further object of my invention is to so design my improved drive mechanism with certain safety features, so that nothing will break and to this end instead of providing a positive chain drive for the main drive shaft, I provide a friction V belt drive which will slip under excessive loads, and I also provide a break pin in the apron drive which will break at a single point and only require the replacement of another simple break pin instead of replacing a major part of the drive mechanism.

A further object of my invention is to provide a novel type of lower beater or spreader. In the prior art it was thought necessary to have an upper beater and a lower beater for shredding the manure and an extra beater in rear thereof to function as a spreader. I preferably construct my improved lower beater, so that the extra spreading beater may be eliminated and so that the lower beater functions both as the shredding and spreading beater due to my novel construction. For this purpose, I employ rows of spades angled respectively to the right and to the left to throw the material laterally as well as rearwardly and so angled as to present sharp front surfaces capable of shredding the manure prior to casting it.

A further object of my invention is to provide rearwardly tilted spades to throw small amounts of material in the most efficient directions for the optimum amount of even spreading.

A further feature of my invention is to so construct my beater that enough material will be urged by the upper beater over the lower beater to throw sufficient manure immediately to the rear of the central portion of the lower beater and so that there will be no obstructions in the path of the manure thus thrown I preferably mount the spades on the beater in two series, one of which is the antipode of the other, so that there will be sufficient space centrally of the lower beater to feed material directly behind the center of the beater.

A further object of my invention is to provide spades of inherently strong construction which do both the shredding, casting and spreading, and which are so shaped and constructed of such strength that they will not bend on hitting any slight obstruction in use, the prior art merely showing teeth which became readily bent or broken on striking any such obstacle.

These and such other objects of my invention as may hereinafter appear will be best understood from a description of an embodiment thereof such as is shown in the accompanying drawings.

In the drawings, Fig. 1 is a perspective view of a power actuated trailer load feeder and spreader constructed in accordance with my invention, partially broken away to show the conveyor, and connected to a motive power vehicle, such as a tractor shown in dotted lines.

Fig. 2 is a plan view thereof.

Fig. 3 is a transverse sectional view through a portion of the body of the spreader taken along the line 3—3 of Fig. 2.

Fig. 4 is a transverse sectional view taken along the line 4—4 of Fig. 2 through the front wall of the body and showing a portion of the drive shaft in side elevation.

Fig. 5 is a transverse sectional view taken along the line 5—5 of Fig. 2 through the rear beater and the adjacent portion of the body showing its detachable drive means.

Fig. 6 is a vertical sectional view through the detachable splined coupling for joining the lower beater shaft to its drive means, taken along the line 6—6 of Fig. 5.

Fig. 7 is a side elevation of my improved feeder and spreader.

Fig. 8 is a rear elevation thereof.

Fig. 9 is a skeleton sectional view taken along the line 9—9 of Fig. 2 looking towards the drive mechanism for the apron with the side wall of the body removed.

Fig. 10 is a transverse sectional view through the apron drive mechanism, taken along the line 10—10 of Fig. 9.

Fig. 11 is a rear elevation of the lower beater I preferably employ.

Fig. 12 is an end elevation thereof.

In the drawings, wherein like characters of reference generally indicate like parts throughout, 20 generally indicates a power actuated trailer load feeder and spreader constructed in accordance with my invention.

Broadly, my invention includes a load receiving body 22, having a continuous apron conveyor 24 mounted to move over and under the base 26 of said body, having feeding means including chain means 28 movable over said body. A suitable drive shaft 30 is provided for driving the apron.

I employ suitable means such as the wheels 32 movable over the terrain to support said body, although it is obvious that caterpillar tracks, sleds or any equivalent type of means may be provided for this purpose.

I also provide means 34 to couple said trailer to a power motive vehicle 36 such as the tractor 36 shown.

I also provide drive means for said apron 24 comprising a drive shaft 38 projecting forwardly from said body adapted to be coupled to a rotating drive means 40 projecting rearwardly from said power motive vehicle 36.

I also provide a main drive shaft 42 mounted on said body 22 to extend from substantially in front to the rear thereof and I provide slippable drive means 44 operatively connecting said power vehicle drive shaft 38 to said main drive shaft 42 and drive means 46 operatively connecting said main drive shaft with said apron drive shaft 30, preferably having the variable speed transmission 48, reduction gearing 50 and a shear pin 52 therein.

When the device is also employed as a spreader, I provide the lower beater 54 having the drive shaft 56 detachably mountable on said body 22 and an upper beater 58 having a drive shaft 60 detachably mounted on said body 22, and where said beaters are employed I modify the drive means so that it may selectively drive the apron or the beater or cumulatively drive both together, and I provide drive means 62 detachably selectively connecting said main drive shaft 42 with said lower beater drive shaft 56 and drive means 64 operatively connecting said lower beater 54 with said upper beater 58, so that said beaters 54 and 58 may be operated independently of the apron 24 when the transmission 48 is in neutral and the apron 24 may be operated independently of the beaters 54 and 58 when the beaters are removed.

In my preferred embodiment, I specifically construct the parts of my device as follows:

The load receiving body has the base 26, having channels 68 adjacent each side thereof and open portions 70 and 72 at the front and rear thereof respectively, the front wall 74, the side walls 76 and 77 having the downwardly tapered rear ends 78, and the open rear end 80.

The apron conveyor comprises the endless apron chains 28 riding in said channels 68 on each side of said base 26 and underneath them and spaced horizontal feeding slats 84 joined at intervals to said chain 28 movable over said base 26 in contact therewith.

As means to operatively drive said apron, I provide the idler shaft 86 having sprocket gears 88 on each end thereof to engage said apron chain 28 mounted on said body 20 and extending across the open front portion 70 of said base, and I provide the drive shaft 30 having the chain sprocket gears 90 on each end thereof mounted on said body 22 and extending across the rear open portion 72 of said base, with said drive shaft extending through a side wall 76.

As stated, I employ the cylindrical lower beater 54, the particular construction of which will be described later, having the beater shaft 56, having the stub 92 projecting beyond the drive end of the beater, having splines 94 thereon and an opposite end 96, having the sprocket gear 98 thereon detachably mounted on the lower portion of the inclined rear end 28 of the opposite side wall 77 opposite from the drive side wall 76, namely, the side wall having the drive shaft 42 mounted along the length thereof. In the specific embodiment shown, I also employ the toothed upper beater 58 having spaced horizontal rows of spikes preferably right triangular spikes or other shredding protuberances 99 projecting therefrom and a shaft 100 which may comprise the stubs projecting from each end thereof, having ends detachably mounted on the upper portions of the inclined end walls 78 of said side walls 76 and 77 by means of the split bearings 79 having the removable portions 81 and a sprocket 102 on the opposite end thereof. The lower beater may have a similar split bearing 79 on its end mounted on the inclined end portion 78 of the side wall 77.

In the embodiment shown, the drive shaft 38 projecting forwardly from said body, has the V belt pulley 104 mounted thereon adjacent said body, said shaft being supported on the bearing 106 bolted by the bolts 108 to a cross member 110 extending forwardly along the upper edge of the front wall 74. Said shaft 38 also has the universal joint 112 therein in front of said pulley and the end 114 adapted to be coupled by the coupling 116 to a rotating drive shaft 40 projecting rearwardly from said power motor vehicle.

In the embodiment shown, I preferably mount the upper drive shaft 42 on the drive side wall 76 of said body to extend from substantially in front to the rear thereof and having a V-belt pulley 120 mounted thereon in front of said body 22. Said shaft 42 has the sprocket 122 mounted thereon in rear of its wheel 32 and a small bevel gear 124 mounted on the rear end thereof. The V belt means 126 comprise one or more V belts connecting the V pulley 104 on the drive shaft 38 with the V pulley 120 on the front end of the side drive shaft 42. While I have shown three V belts for this purpose, it is obvious that any desired number may be used in accordance with the size of the feeder. I employ V belts for safety purposes instead of chains, as they will slip when an excessive load is superimposed thereon, instead of breaking.

I will now describe the means for detachably connecting the end 92 of the lower beater stub shaft to its drive means. For this purpose, I provide the stub shaft 128 extending through a bearing 130 in the body drive side wall 76, having a splined end 131 opposite the splined end 94 of said lower beater shaft 56 and the bevel gear 132 on the outer end thereof, said bevel gear 132 meshing with the bevel gear 124 on the rear end of the main drive shaft 42 to provide means for operatively connecting said main drive shaft to said beater shaft.

I provide an internally grooved coupling 134 internally grooved as at 136 for detachably joining said splined shaft ends 94 and 131 together to permit ready removal of said lower beater therefrom after its opposite end has been removed from the split bearing 79.

I provide the chain 64 connecting said respective beater sprockets 98 and 102 to operatively connect the upper beater with the lower beater.

I also provide the lower drive means 46 extending rearwardly of a wheel 32. Said drive means comprises a rod 140 having the sprocket 142 at its front end thereof driven by the chain 144, meshing with the sprocket 122 on the main drive shaft to operatively connect said rod 140 therewith. As stated, said lower drive means comprises a plurality of rods and shafts connected together. The rod 140 passes into the change speed transmission 48 manually operated by the handle 146. Said change speed transmission is of relatively well known construction and has suitable manipulation thereof for low, medium or high and reverse speeds. Power is transmitted therefrom through the drive rod 148 projecting rearwardly therefrom. Said drive rod 148 also has the supplemental drive rod 150 in alignment therewith rearwardly thereof connected thereto by the universal joint 152.

As stated, I also employ a suitable reduction gearing 50 in said drive means 46. While said reduction gearing may be of any suitable form, in the embodiment shown it comprises the bevel pinion gear 154 on said rod 150 in mesh with a large bevel gear 156 suitably mounted on a shaft 158, having a spur pinion gear 160 rigidly mounted thereon.

As stated hitherto, I provide additional safety means such as the shear pin 52 connected in the means for operatively connecting said drive means 46 with said apron drive shaft 30. For this purpose, I provide the sleeve 162 suitably keyed by the key 164 to the apron drive shaft 30 having the annular flange 166 on the outer edge thereof.

I also provide the spur gear 168 loosely mounted on said apron drive shaft 30 in mesh with said spur pinion gear 160 and I provide the shear pin 52 connecting said spur gear 168 and flange 166 breakable on excessive loads on said apron.

As stated, I provide a cylindrical lower beater 54 of novel design which functions both as a shredding and spreading beater and eliminates the use of the spreading beater formerly thought necessary in former types of load spreaders. For this purpose, I provide the cylindrical lower shredding and spreading beater 54 which, in the embodiment shown, is provided with the external cylindrical shell, but which may only comprise the frame immediately below the spades of cylindrical shape for supporting the spades, if desired. Broadly, these comprise spiral rows 170a and 170a' to the right and 170b and 170b' to the left of spades on each side thereof, each spade 172 being attached at an angle from the horizontal, preferably at substantially 45° and tilted backwardly substantially from the radial, preferably from 20-30°, each spiral row extending outwardly from a common central spade 174 to the outer end 178 of said beater 54 with the spades in the right spirals 170a and 170a' facing to the right and the spades in the left spirals 170b and 170b' facing to the left. In my preferred embodiment, I preferably employ two spaced sets 176 and 176' of the two spaced right and left hand rows 170a and 170b, comprising one series, and the rows 170a' and 170b' comprising the other series, with each row of each series extending spirally outwardly from a common central spade 174 to longitudinally aligned points 178 on the exterior ends and all spades 172 in each row being equidistant from one another and successively advancing laterally towards the outer adjacent ends 178, the inner end of the leading edge of one spade member is in substantial circumferential alignment with the outer end of the trailing edge of the adjacent rearwardly disposed spade, as shown in Fig. 11. In my preferred embodiment, one of said rows of spades in each series is provided with extra spades 175 therein extending in spiral alignment beyond said center spade to its obliquely opposite row. Each spade is respectively welded to the cylinder 54 or to the skeleton cylinder 54 and is preferably provided with the strengthening ribs 184 in the rear thereof, preferably at each end thereof. It is obvious that with this construction, the respective spades being at an angle of 45°, provide a structure in the nature of a shredding prong which strikes the manure and slits and shreds it prior to catching a small mass of manure opposite the front surface thereof and hurling it outwardly by centrifugal force as the beater is rotated. It is obvious that the faster the beater is moved, the more manure will be fed therefrom. It is thus apparent that with this construction a spade assumes an operating action for achieving both shredding and spreading, and the necessity for a spreading beater is obviated.

In use, the feeder is suitably coupled to its tractor 36 through the medium of the coupling 34 and the drive shaft 38 coupled to the drive means 40 projecting rearwardly from the tractor by means of the coupling 116. It is obvious that with this construction the beaters are immediately rotated unless the power take-off clutch is moved to neutral position. The transmission handle 146 is then operated to set the transmission 48 at the desired speed for feeding the apron 24 and the tractor may be started and the device operated. The speed may be changed by movements of the transmission handle 146 in use on stoppage of the tractor. The device will continue to function until the load is fed and spread. A power loader may then readily dump another load therein.

In case it be desired merely to feed the load, the upper and lower beaters are readily removed by their respective detachable couplings and the device employed without the beaters. Should it be desired to temporarily run the beaters without the apron, the variable speed transmission 48 may be temporarily placed in neutral for this purpose.

It is apparent that I have provided a novel type of power actuated trailer load feeder which may also be operated as a spreader, if desired, with the advantages described above.

It is understood that my invention is not limited to the specific embodiment shown and that various deviations may be made therefrom without departing from the spirit and scope of the appended claims.

What I claim is:

1. A cylindrical lower shredding and spreading beater for use in load feeders, having two spaced series of two spiral rows of spades, each spade being attached at substantially 45° from the horizontal and tilted backwards about 20–30° from the radial and having strengthening ribs in the rear thereof, each row of each series extending outwardly from a common central spade to substantially longitudinally aligned points on the outer ends of the cylinder, and all spades being equidistant from each other and successively advancing laterally towards the outer end substantially its own projection, with the spades in the right spiral facing to the right and the spades in the left spiral facing to the left, one of said rows having spades therein extending beyond said central spades substantially to the opposite series row.

2. A cylindrical lower shredding and spreading beater for use in load feeders, having spaced series of two spiral rows of spades, each spade being attached at the same angle from the horizontal and tilted backwards substantially from the radial, each row of each series extending outwardly from a common central spade to substantially longitudinally aligned points on the outer ends of the cylinder, with the spades in the right spiral facing to the right and the spades in the left spiral facing to the left.

3. A cylindrical lower shredding and spreading beater for use in load feeders, having spaced series of two spiral rows of spades, each spade being attached at substantially 45° from the horizontal and tilted backwards about 20–30° from the radial, each row of each series extending outwardly from a common central spade to substantially longitudinally aligned points on the outer ends of the cylinder, with the spades in the right spiral facing to the right and the spades in the left spiral facing to the left.

4. A cylindrical lower shredding and spreading beater for use in load feeders, having spaced series of two spiral rows of spades, each spade being attached at an angle from the horizontal and tilted backwards substantially from the radial, each row of each series extending outwardly from a common central spade to substantially longitudinally aligned points on the outer ends of the cylinder, and all spades being equidistant from each other and successively advancing laterally towards the outer edge substantially its own projection, with the spades in the right spiral facing to the right and the spades in the left spiral facing to the left.

5. A cylindrical lower shredding and spreading beater for use in load feeders, having two spiral rows of spades on each end thereof, each spade being attached at an angle from the horizontal and tilted backwards substantially from the radial, each row extending outwardly from a central spade to the outer ends of the cylinder, with the spades in the right spirals facing to the right and the spades in the left spirals facing to the left, the inner end of the leading edge of one spade member being in substantial circumferential alignment with the outer end of the trailing edge of the adjacent rearwardly disposed spade member.

A. P. STUART GILMORE.

REFERENCES CITED

The following references are of record in the file of this patent:

UNITED STATES PATENTS

| Number | Name | Date |
| --- | --- | --- |
| 993,640 | Barnard | May 30, 1911 |
| 1,008,089 | Synck | Nov. 7, 1911 |
| 1,177,391 | Davis | Mar. 28, 1916 |
| 1,194,226 | Pickett | Aug. 8, 1916 |
| 1,225,873 | Sharp | May 15, 1917 |
| 1,777,127 | Orelind | Sept. 30, 1930 |
| 1,945,532 | Lima | Feb. 6, 1934 |
| 2,121,925 | Oczko | June 28, 1938 |
| 2,221,266 | Roach | Nov. 12, 1940 |
| 2,240,720 | Selhorst | May 6, 1941 |
| 2,256,815 | Raney et al. | Sept. 23, 1941 |